United States Patent
Kurokawa

(10) Patent No.: US 7,310,524 B2
(45) Date of Patent: Dec. 18, 2007

(54) WIRELESS BASE STATION, NETWORK SYSTEM, COMMUNICATION METHOD, AND BASE STATION CONTROL PROGRAM

(75) Inventor: Hideki Kurokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 153 days.

(21) Appl. No.: 10/875,536

(22) Filed: Jun. 25, 2004

(65) Prior Publication Data

US 2004/0266427 A1 Dec. 30, 2004

(30) Foreign Application Priority Data

Jun. 27, 2003 (JP) .............................. 2003-185704

(51) Int. Cl.
*H04Q 7/20* (2006.01)
(52) U.S. Cl. .................. 455/426.2; 455/561; 455/445; 370/352
(58) Field of Classification Search ............. 455/414.1, 455/554.1, 554.2, 533, 445, 561, 426.2; 370/338, 370/352
See application file for complete search history.

(56) References Cited

U.S. PATENT DOCUMENTS

| 6,909,705 | B1* | 6/2005 | Lee et al. ................... 370/338 |
| 6,961,559 | B1* | 11/2005 | Chow et al. .............. 455/414.1 |
| 2002/0191572 | A1* | 12/2002 | Weinstein et al. .......... 370/338 |
| 2004/0072590 | A1* | 4/2004 | Eynard et al. ........... 455/554.1 |
| 2005/0249117 | A1* | 11/2005 | Gerkins ...................... 370/230 |

FOREIGN PATENT DOCUMENTS

| JP | 08-274776 | 10/1996 |
| JP | 2000-308154 | 11/2000 |
| JP | 2003-060656 | 2/2003 |
| JP | 2003-110567 | 4/2003 |
| WO | WO 99/22547 | 5/1999 |

* cited by examiner

*Primary Examiner*—Temica Beamer
(74) *Attorney, Agent, or Firm*—McGinn IP Law Group, PLLC

(57) ABSTRACT

This invention provides a wireless network system including a logically or physically separated wired network, a wireless base station connected to the wired network, and a plurality of wireless mobile terminals which performs wireless communication with the wireless base station. The wireless base station used in this system includes a wired communication unit which is connected to a wired network, a wireless communication unit which performs wireless communication using one radio frequency, and a wired line/wireless channel bridging function. The wireless base station also includes a control unit which controls one wireless communication unit to send out packets storing pieces of information corresponding to a plurality of virtual wireless networks so as to form a plurality of virtual wireless networks.

31 Claims, 6 Drawing Sheets

| BSSID | ESSID | VLAN ID | MAX RETRY1 | MAX RETRY2 | DTIM PERIOD | ASSOCI-ATION | AUTHENTI-CATION |
|---|---|---|---|---|---|---|---|
| xxxxx:01 | ESS1 | ID1 | 9 | 12 | 1 | o | OPEN |
| xxxxx:02 | ESS2 | ID2 | 24 | 32 | 3 | p | 802.1x |
| xxxxx:03 | Voice | ID3 | 1 | 4 | 5 | q | 802.1x |
| xxxxx:04 | Guest | ID4 | 9 | 12 | 1 | r | OPEN |
| ⋮ | ⋮ | ⋮ | ⋮ | ⋮ | ⋮ | ⋮ | ⋮ |

54a

FIG. 5A
HEADER INFORMATION
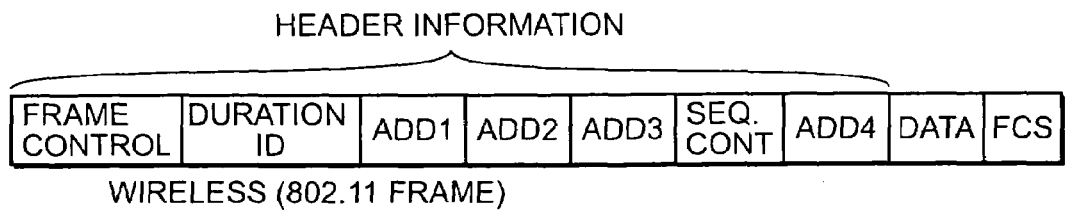
WIRELESS (802.11 FRAME)
FIG. 5B
HEADER INFORMATION
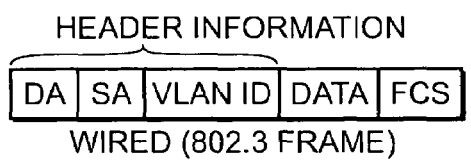
WIRED (802.3 FRAME)
FIG. 5C
| TO DS | FROM DS | ADDRESS 1 | ADDRESS 2 | ADDRESS 3 | ADDRESS 4 |
|---|---|---|---|---|---|
| 0 | 0 | DA | SA | BSSID | N/A |
| 0 | 1 | DA | BSSID | SA | N/A |
| 1 | 0 | BSSID | SA | DA | N/A |
| 1 | 1 | RA | TA | DA | SA |
FIG. 6A
VOICE PACKET (RTP G.711/20msRTP)
FIG. 6B
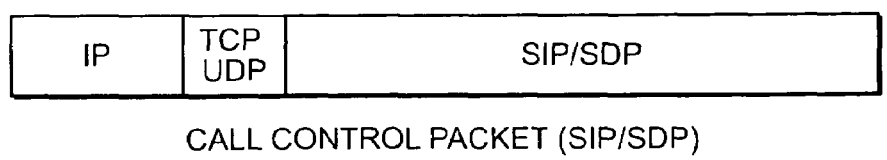
CALL CONTROL PACKET (SIP/SDP)

WIRELESS BASE STATION, NETWORK SYSTEM, COMMUNICATION METHOD, AND BASE STATION CONTROL PROGRAM

BACKGROUND OF THE INVENTION

1. Field of the Invention

The present invention relates to a wireless base station which includes a wired interface and a wireless communication unit which performs wireless communication and controls connection for wireless communication, a wireless network system, a wireless communication method, and a wireless base station control program.

2. Description of the Prior Art

In general, in a wireless network system in which a wireless LAN using wireless transmission as a transmission medium is connected to a wired LAN, when transferring a data frame from the wired LAN to a wireless channel, a wireless base station sends it out as a data frame to which a wireless header storing a basic service set identifier (BSSID) is added.

When a wireless mobile terminal associated with a wireless base station is to transmit a data frame to a wired LAN through the wireless base station, the wireless mobile terminal transmits, to the wireless base station, a data frame to which a wireless header storing the basic service set identifier of the wireless base station with which the wireless mobile terminal is associated is added. With this operation, upon reception of this data frame, the wireless base station transfers the data frame to the wired LAN.

The wireless base station supports switching to another wireless base station and provide mobility by periodically sending out, to the wireless mobile terminal, notification information containing an extended service set identifier (ESSID) or returning an extended service set identifier stored in a management frame corresponding to a request from the wireless mobile terminal and allowing the wireless mobile terminal to identify a distribution system (DS) of its own.

As described above, the wireless mobile terminal participates in a predetermined distribution system by being associated with (association) a wireless base station in which the extended service set identifier registered in a memory of the wireless mobile terminal coincides with the extended service set identifier stored in notification information from the wireless base station or the extended service set identifier stored in a management frame returns in response to a request from the wireless mobile terminal.

When performing so-called wired LAN to wireless LAN bridging, i.e., transferring data frames received from the respective interfaces (a wired LAN and wireless channel) i.e., a wireless communication unit and a wired interface, the wireless base station transmits/receives data frames to which wireless headers storing basic service set identifiers are attached, thereby allowing transfer of the data frames between the wireless base station and the wireless mobile terminal without any connection error in a wireless zone.

In a wireless LAN system using a wireless base station having this wired LAN to wireless LAN bridging function, each wireless mobile terminal makes upper layer settings so as to identify a network, thereby allowing a plurality of wireless mobile terminals to use a single wireless base station as one wireless LAN.

In communication using IP at the upper layer, by assigning 192.168.1.10/24 to the first wireless mobile terminal, 192.168.1.11/24 to the second wireless mobile terminal, and 192.168.1.12/24 to the third wireless mobile terminal, the respective mobile terminals can communicate with terminals and servers connected to the wired LAN through IP in one network through the same wireless base station.

In this wireless LAN system, since a network for each wireless mobile terminal is identified on OSI reference model layer 3 (network layer), when a wireless mobile terminal having a different network address moves to the same wireless base station (roaming), communication cannot be continued.

In addition, when NetBEUI (NetBIOS Extended User Interface) which does not provide a routing function for a network protocol, a broadcast flows between wireless mobile terminals associated with the same wireless base station. This makes it impossible to separate networks, positing a problem in terms of security.

In order to solve such a problem, in a wireless LAN, a layer 2 switch having the VLAN function of separating networks on the data link layer is used to provide a function of logically separating physically identical networks.

A wireless LAN system using wireless transmission as a transmission medium has an acknowledgement function (ACX) or retry function (Retry) to improve the reliability of a transmission path.

Some wireless mobile terminal has a power saving function of suppressing power consumption by intermittently receiving notification information after associated with a wireless base station.

A wireless base station identifies and manages a wireless mobile terminal which performs power saving operation. While the wireless mobile terminal receives no signal, the wireless base station buffers, in its memory, a data frame addressed to the wireless mobile station, and notifies the wireless mobile terminal of information indicating that the data frame is buffered, by using an information element (TIM) of notification information. A broadcast to the wireless mobile terminals associated with the wireless base station is transmitted to each wireless mobile terminal after notification information with a delivery traffic indication message (DTIM) at predetermined intervals.

That is, a wireless mobile terminal designed to perform power saving operation needs to receive notification information with a delivery traffic indication message for the reception of a broadcast.

In order to implement a function of separating networks with which wireless mobile terminals are associated, according to Japanese Unexamined Patent Publication No. 2003-110567 (Reference 1), each of wireless base stations using the same radio frequency includes an embedding unit which requires segment information of a wireless mobile terminal as a transmission target and embeds the information in a frame. According to Japanese Unexamined Patent Publication No. 2003-60656 (Reference 2), networks are separated from each other by associating the MAC addresses of subordinate wireless mobile terminals with VLAN identifiers.

In order to separate wireless networks from each other like wired LANs, a wireless base station must be installed for each network, posing a problem in terms of cost. In addition, since the number of radio frequencies which can be used between a plurality of wireless base stations are limited, it is physically impossible to install such wireless base stations.

In addition, the following problems arise in the network separation scheme according to Reference 1:
(a) Since segment information must be embedded in a frame, a management frame must be modified in accordance with IEEE802.11. That is, this scheme can be applied to only wireless mobile terminals conforming to a special management frame.

(b) Even if networks can be separated from each other between wireless mobile terminals, since the same notification information is used, the terminals operate by using the information element of the notification information. For example, such terminals use common notification information with a delivery traffic identification message which determines the leading edge period of each terminal operating in the power saving mode or a common traffic display message indicating that a data frame is buffered. For example, therefore, even a wireless mobile terminal registered in a network domain with a few broadcasts must be started like a wireless mobile terminal registered in a network domain with many broadcasts, resulting in wasteful power consumption.

(c) When a data network for e-mail, Web browsing, and the like and a network for different characteristics of media such as media for voice communication based on Voice over IP and moving images based on MPEG4 are to be separated and constructed by using this function of separating wireless networks, a predetermined retry count is used as a retry count for data in a conventional wireless base station. If, therefore, the retry count in a data network for which high reliability is required is increased, the increased retry count is applied to a voice data network having priority on real-time performance. As a consequence, a delay due to an error in a wireless zone increases, resulting in a deterioration in real-time performance.

(d) Since wireless mobile terminals are managed by the same wireless base station in different wireless networks, if, for example, the number of wireless mobile terminals associated with each wireless network (Association count) is limited to ensure a wireless zone for voice communication, the number of wireless mobile terminals for a data network is limited in the same manner. This makes it difficult to perform connection management for wireless mobile terminals designed to handle data frames with different characteristics.

In the scheme of separating networks by associating the MAC addresses of wireless mobile terminals with VLAN identifiers in patent reference 2 described above as well, since identical pieces of notification information are used, if, for example, an open authentication algorithm is used for a data network for guests, the open authentication algorithm is applied to another network, posing a problem in terms of security.

SUMMARY OF THE INVENTION

The present invention has been made in consideration of the above situation in the prior art, and has as its first object to provide a wireless base station, wireless network system, wireless communication method, and wireless base station control program which can form logically separated virtual wireless networks by using physically the same wireless communication unit designed to perform wireless communication using one radio frequency, while performing communication using packets each having a frame structure set as a public standard such as IEEE802.11.

It is the second object of the present invention to provide a wireless base station, wireless network system, wireless communication method, and wireless base station control program which can obtain a coexistence environment in which the same wireless base station can use traffics with different characteristics, e.g., a data network and voice network.

It is the third object of the present invention to provide a wireless base station, wireless network system, wireless communication method, and wireless base station control program which can construct network environments suitable for the respective types of packets for different clients using the same wireless base station.

In order to achieve the above objects, according to the first aspect of the present invention, there is provided a wireless base station including wired communication unit which is connected to a wired network, wireless communication unit which performs wireless communication by using one radio frequency, and a wired line/wireless channel bridging function, comprising a control unit which controls the one wireless communication unit to send out packets storing pieces of information corresponding to a plurality of virtual wireless networks so as to form the plurality of virtual wireless networks.

According to the second aspect of the present invention, there is provided a wireless base station in which the control unit described in the first aspect causes the one wireless communication unit to send out, as packets storing pieces of information corresponding to a plurality of virtual wireless networks, notification information storing an information element which changes for the each virtual wireless network and a packet containing a basic service set identifier which changes for the each virtual wireless network.

According to the third aspect of the present invention, there is provided a wireless base station in which the station comprises a management table in which identifiers of logically or physically separated wired networks and basic service set identifiers of virtual wireless networks coupled to the networks are associated with each other, and the control unit described in the first or second aspect converts on the basis of the management table header information of a packet which is received by the wired communication unit and addressed to a wireless channel, sends out the information through the wireless communication unit, converts on the basis of the management table header information of a packet which is received by the wireless communication unit and addressed to a wired line, and sends out the information through the wired communication unit.

According to the fourth aspect of the present invention, there is provided a wireless base station in which in the management table described in the third aspect, identifiers of the wired networks and extended service set identifiers of virtual wireless networks coupled to the networks are stored so as to be associated with each other.

According to the fifth aspect of the present invention, there is provided a wireless base station in which the control unit described in the fourth aspect stores an extended service set identifier which changes for each virtual wireless network in a management frame to be returned in response to a request from a wireless mobile terminal on the basis of the management table, and returns the management frame to the wireless mobile terminal which has sent the request, together with a basic service set identifier of the virtual wireless network to which the extended service set identifier is assigned.

According to the sixth aspect of the present invention, there is provided a wireless base station in which in the management table described in any one of the third to fifth aspects, identifiers of the wired networks and association counts of virtual wireless networks coupled to the networks are stored so as to be associated with each other.

According to the seventh aspect of the present invention, there is provided a wireless base station in which the control unit described in the sixth aspect identifies a type of wireless mobile terminal associated with a virtual wireless network from an extended service set identifier of the virtual wireless network, and performs control to change the association count in the management table in accordance with a traffic amount for each type of wireless mobile terminal associated with the virtual wireless network having a basic service set identifier with which the association count is associated.

According to the eighth aspect of the present invention, there is provided a wireless base station in which in the management table described in any one of the third to seventh aspects, identifiers of the wired networks and maximum retry counts of virtual wireless networks coupled to the networks are stored so as to be associated with each other.

According to the ninth aspect of the present invention, there is provided a wireless base station in which the maximum retry counts in the management table described in the eighth aspect can be set at not less than one level for each virtual wireless network, and the control unit changes the maximum retry count to not less than one level in accordance with a characteristic of a received packet.

According to the 10th aspect of the present invention, there is provided a wireless base station in which the maximum retry counts in the management table described in the ninth aspect are set at two levels on a side with a few broadcasts and a side with many broadcasts for each virtual wireless network, the characteristic of the received packet indicates a real-time communication packet which is set in advance as a packet to be used for communication whose communication contents are reproduced in real time at a transmission destination and a control packet for the real-time communication packet, and the control unit performs control to set the maximum retry count on the side with a few broadcasts when the characteristic of the received packet indicates a real-time communication packet, and sets the maximum retry count on the side with many broadcasts when the characteristic of the received packet indicates a control packet.

In this case, a real-time communication packet includes, for example, a voice packet and a packet used for streaming in MPEG or the like.

According to the 11th aspect of the present invention, there is provided a wireless base station in which in the management table described in any one of the third to 10th aspects, identifiers of the wired networks and authentication methods in virtual wireless networks coupled to the networks are stored so as to be associated with each other.

According to the 12th aspect of the present invention, there is provided a wireless base station in which in the management table described in any one of the third to 11th aspects, identifiers of the wired networks and delivery traffic indication message notification information periods in virtual wireless networks coupled to the networks are stored so as to be associated with each other.

In order to achieve the above objects, according to the 13th aspect of the present invention, there is provided a wireless network system comprising a logically or physically separated wired network, a wireless base station connected to the wired network, and a plurality of wireless mobile terminals which perform wireless communication with the wireless base station, the wireless base station including wired communication unit which is connected to a wired network, a wireless communication unit which performs wireless communication with the wireless mobile terminals by using one radio frequency, and a wired line/wireless channel bridging function, and a control unit which controls the one wireless communication unit to send out packets storing pieces of information corresponding to a plurality of virtual wireless networks so as to form the plurality of virtual wireless networks.

According to the 14th aspect of the present invention, there is provided a wireless network system in which the control unit described in the 13th aspect causes the one wireless communication unit to send out, as packets storing pieces of information corresponding to a plurality of virtual wireless networks, notification information storing an information element which changes for the each virtual wireless network and a packet containing a basic service set identifier which changes for the each virtual wireless network.

According to the 15th aspect of the present invention, there is provided a wireless network system in which the station comprises a management table in which identifiers of logically or physically separated wired networks and basic service set identifiers of virtual wireless networks coupled to the networks are associated with each other, and the control unit described in the 13th or 14th aspect converts on the basis of the management table header information of a packet which is received by the wired communication unit and addressed to a wireless channel, sends out the information through the wireless communication unit, converts on the basis of the management table header information of a packet which is received by the wireless communication unit and addressed to a wired line, and sends out the information through the wired communication unit.

According to the 16th aspect of the present invention, there is provided a wireless network system in which in the management table described in the 15th aspect, identifiers of the wired networks and extended service set identifiers of virtual wireless networks coupled to the networks are stored so as to be associated with each other.

According to the 17th aspect of the present invention, there is provided a wireless network system in which the control unit described in the 16th aspect stores an extended service set identifier which changes for each virtual wireless network in a management frame to be returned in response to a request from a wireless mobile terminal on the basis of the management table, and returns the management frame to the wireless mobile terminal which has sent the request, together with a basic service set identifier of the virtual wireless network to which the extended service set identifier is assigned.

According to the 18th aspect of the present invention, there is provided a wireless network system in which in the management table described in any one of the 15th to 17th aspects, identifiers of the wired networks and association counts of virtual wireless networks coupled to the networks are stored so as to be associated with each other.

According to the 19th aspect of the present invention, there is provided a wireless network system in which the control unit described in the 18th aspect identifies a type of wireless mobile terminal associated with a virtual wireless network from an extended service set identifier of the virtual wireless network, and performs control to change the association count in the management table in accordance with a traffic amount for each type of wireless mobile terminal associated with the virtual wireless network having a basic service set identifier with which the association count is associated.

According to the 20th aspect of the present invention, there is provided a wireless network system in which in the management table described in any one of the 15th to 20th aspects, identifiers of the wired networks and maximum retry counts of virtual wireless networks coupled to the networks are stored so as to be associated with each other.

According to the 21st aspect of the present invention, there is provided a wireless network system in which the maximum retry counts in the management table described in the 20th aspect can be set at not less than one level for each virtual wireless network, and the control unit changes the maximum retry count to not less than one level in accordance with a characteristic of a received packet.

According to the 22nd aspect of the present invention, there is provided a wireless network system in which the maximum retry counts in the management table described in the 21st aspect are set at two levels on a side with a few broadcasts and a side with many broadcasts for each virtual wireless network, the characteristic of the received packet indicates a real-time communication packet which is set in advance as a packet to be used for communication whose communication contents are reproduced in real time at a transmission destination and a control packet for the real-time communication packet, and the control unit performs control to set the maximum retry count on the side with a few broadcasts when the characteristic of the received packet indicates a real-time communication packet, and sets the maximum retry count on the side with many broadcasts when the characteristic of the received packet indicates a control packet.

According to the 23rd aspect of the present invention, there is provided a wireless network system in which in the management table described in any one of the 15th to 22nd aspects, identifiers of the wired networks and authentication methods in virtual wireless networks coupled to the networks are stored so as to be associated with each other.

According to the 24th aspect of the present invention, there is provided a wireless network system in which in the management table described in any one of the 15th to 23rd aspects, identifiers of the wired networks and delivery traffic indication message notification information periods in virtual wireless networks coupled to the networks are stored so as to be associated with each other.

According to the 25th aspect of the present invention, there is provided a wireless network system comprising a plurality of wireless base stations having identical settings, wherein control units of the plurality of wireless base stations perform control to continue communication without changing a network layer address of the wireless mobile terminal even when the wireless mobile terminal switches a wireless base station for wireless communication among the plurality of wireless base stations.

In order to achieve the above objects, according to the 26th aspect of the present invention, there is provided a wireless communication method in a wireless network system including a logically or physically separated wired network, a wireless base station connected to the wired network, and a plurality of wireless mobile terminals which performs wireless communication with the wireless base station, comprising the sending step of sending out a converted packet after the conversion step of converting header information of a received packet on the basis of a management table including information for conversion of header information of a packet to be transferred, when the wireless base station receives a packet addressed to the wireless mobile terminal from the wired network and sends out the packet to the wireless mobile terminal or receives a packet addressed to a communication partner in the wired network from the wireless mobile terminal and sends out the packet to the communication partner.

According to the 27th aspect of the present invention, there is provided a wireless communication method in a wireless network system, wherein the management table described in the 26th aspect is formed such that identifiers of the respective wired networks and basic service set identifiers of virtual wireless networks coupled to the networks are associated with each other, and in the conversion step, the identifier of the wired network in header information of a packet to be transferred and the basic service set identifier of the virtual wireless network are converted.

According to the 28th aspect of the present invention, there is provided a wireless communication method in a wireless network system, wherein the management table described in the 27th aspect is formed such that identifiers of the respective wired networks and extended service set identifiers of virtual wireless networks coupled to the networks are associated with each other, and in the conversion step, the identifier of the wired network in header information of a packet to be transferred and the basic service set identifier and the extended service set identifier of the virtual wireless network are converted.

In order to achieve the above objects, according to the 29th aspect of the present invention, there is provided a control program for a wireless base station including a wired communication unit which is connected to a wired network, a wireless communication unit which performs wireless communication by using one radio frequency, and a wired line/wireless channel bridging function, the control program causing the wireless base station to execute processing in the step defined in the wireless communication method defined in any one of the $26^{th}$ to $28^{th}$ aspects.

As is obvious from the respective aspects, according to the present invention, logically separated virtual wireless networks can be formed by using physically the same wireless communication unit designed to perform wireless communication using one radio frequency while communication is performed by using packets each having a frame structure set as a standard.

In addition, a coexistence environment can be obtained, in which the same wireless base station designed to perform wireless communication using one radio frequency can use traffics with different characteristics, e.g., a data network and voice network, under settings corresponding to the respective characteristics.

Furthermore, network environments suitable for the respective types of packets can be constructed for different clients using the same wireless base station.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIGS. 5A an 5B are views showing the frame structures of wireless and wired packets set as standards by IEEE802.11 and IEEE802.3, respectively, and FIG. 5C is a view showing a table indicating the meaning of the address of the MAC header of each wireless frame shown in FIG. 5A;

FIGS. 6A and 6B are views showing the signal frame structures of a voice packet and call control packet, respectively;

DETAILED DESCRIPTION OF THE PREFERRED EMBODIMENT

A wireless base station, a wireless network system, a wireless communication method, and a control program for the wireless base station according to a preferred embodiment of the present invention will be described in detail below with reference to the accompanying drawings.

Figure 1:
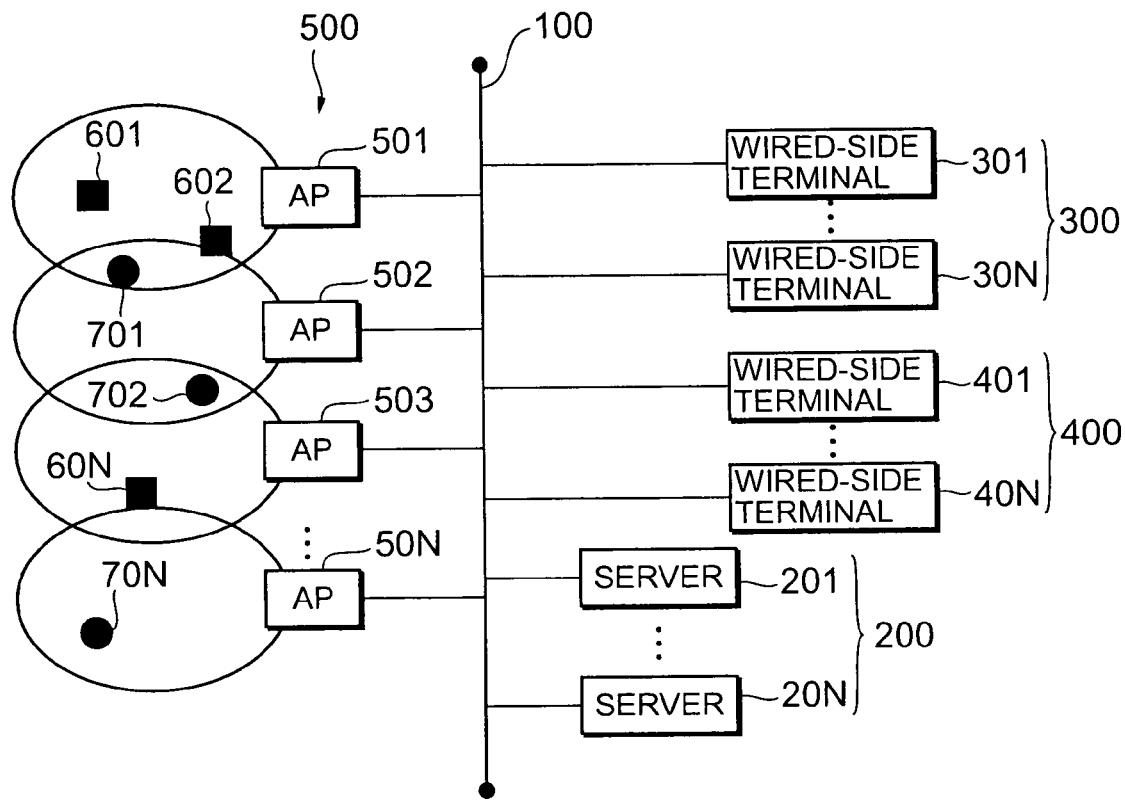
FIG. 1 is a schematic view showing the arrangement of a wireless network system according to an embodiment of the present invention.

As shown in FIG. 1, according to an embodiment of the present invention, wireless base stations 500 (501, 502, ..., 50N) having a function of performing wireless communication between wireless mobile terminals 600 (601, 602, ..., 60N) and 700 (701, 702, ..., 70N) are connected to a wired LAN line 100.

Wired-side terminals 300 (301, ..., 30N) and 400 (401, ..., 40N) and servers 200 (201, ..., 20N) are connected to the wired LAN line 100 to allow communication with the wireless base stations 500 through a wired LAN.

Each of the wired-side terminals 300 and 400 has an arrangement necessary to serve as a computer. In addition, each terminal has a connection interface for the wired LAN and a function as a multimedia terminal which performs real-time communication of moving images, voices, and the like through the wired LAN line 100.

The server 200 has an arrangement necessary to serve as a computer. In addition, the server has a connection interface for the wired LAN and a function as a multimedia server which performs real-time communication of moving images, voices, and the like through the wired LAN line 100.

Each of the wireless mobile terminals 600 (601, 602, ..., 60N) and 700 (701, 702, ..., 70N) has a wireless communication unit (not shown) for performing wireless communication and a function of performing wireless communication with the wireless base stations 500.

With this arrangement, the wireless mobile terminals 600 and 700 can perform real-time communication of moving images, voices, and the like with the wired-side terminals 300 and 400 by using the internet protocol (IP).

The above wired-side terminals 300 and computer 400 are subjected to logical network separation using VLAN (Virtual Local Area Network) identifiers and are associated with different network domains.

Note that this function of separating wired LAN networks is not limited to logical separation using VLAN identifiers but may be a function of locally separating networks by connecting them to different wired LAN lines.

With the above arrangement, the wireless network system of the present invention is connected to the Internet or an intranet to form a multimedia wireless network which provides data communication based on the internet protocol (IP), real-time communication of voices, moving images, and the like in particular.

Figure 2:
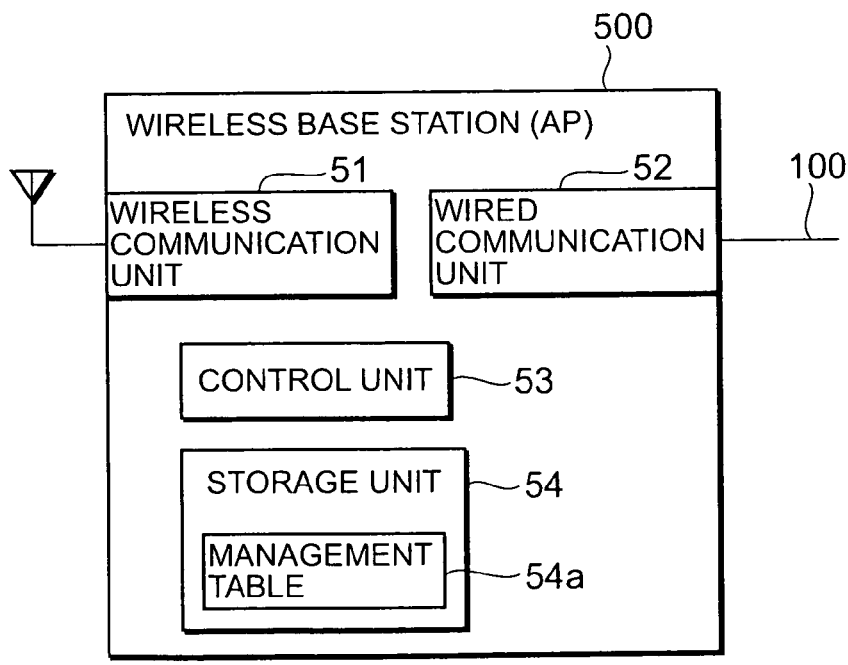
FIG. 2 is a block diagram showing the arrangement of a wireless base station according to an embodiment of the present invention.

As shown in FIG. 2, the wireless base station (AP: Access Point) 500 includes a wireless communication unit 51 which includes an antenna and performs wireless communication by using one radio frequency, a wired communication unit 52 which is connected to the wired LAN line 100 and communicates with the wired LAN, a control unit 53 which controls the main body of the wireless base station 500, and a storage unit 54 which stores a packet when a wireless mobile terminal as a packet transmission destination is in the power saving mode. Note that the control unit 53 may be implemented by a program stored in a ROM or the like, a CPU, and the like.

In order to allow the wireless base station 500 to transfer a packet from the wired LAN line 100 to a wireless mobile terminal by wireless communication or transfer a packet transmitted from a wireless mobile terminal by wireless communication to the wired LAN line 100, the storage unit 54 stores a management table 54a containing information for converting the header information of the packet to be transferred.

The wireless base station 500 has the above arrangement. The respective wireless base stations 500 (501 to 50N) shown in FIG. 1 have the same arrangement and settings. With this arrangement, the control unit 53 of each wireless base station 500 (501 to 50N) performs control to allow a wireless mobile terminal to continue communication, even if the wireless mobile terminal switches the wireless base station for wireless communication among the wireless base stations 501 to 50N, without changing the network layer address of the wireless mobile terminal.

Figures 3, 4:
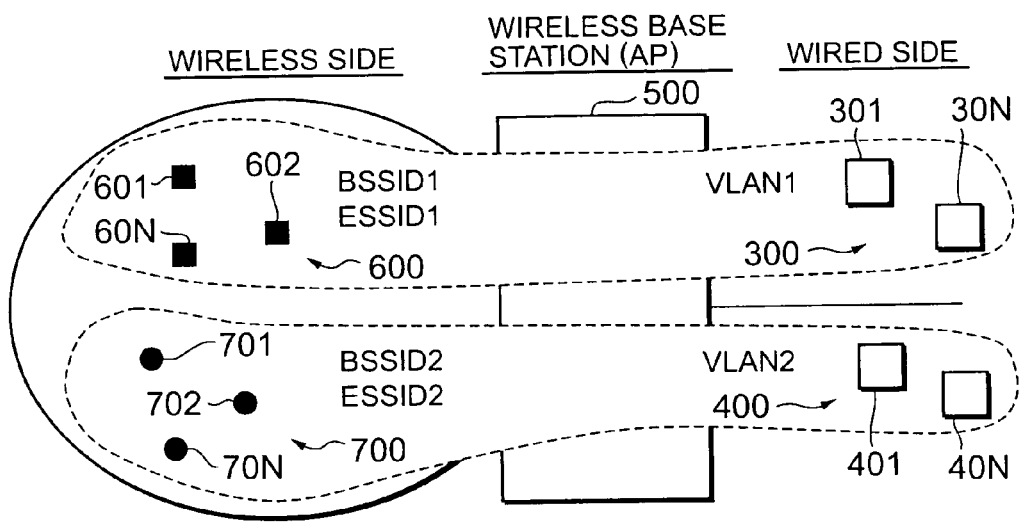
FIG. 3 is a view conceptually showing a state wherein a wireless network is logically separated into a plurality of virtual wireless networks, which in turn are coupled to logically separated wired LANs.
FIG. 4 is a view exemplifying the arrangement of management information stored in a management table.

Having the above arrangement, the wireless base station 500 is provided with a function of forming a plurality of virtual wireless networks logically separated from each other by using the wireless communication unit 51 which performs wireless communication using one radio frequency, as shown in FIG. 3.

FIG. 3 conceptually shows a state wherein the wireless base station 500 logically separates the wireless network into a plurality of virtual wireless networks by using physically the same wireless communication unit 51 which performs wireless communication using one radio frequency, and couples them to logically separated wired LANs using VLAN identifiers so as to form virtual networks.

Unique basic service set identifiers (BDDIDs) and extended service set identifiers (ESSIDs) are assigned to the respective logically separated virtual wireless networks. FIG. 3 schematically shows that the wireless mobile terminal 600 is associated with (association) the virtual wireless network to which BSSID 1 and ESSID 1 are assigned, and the wireless mobile terminal 700 is associated with (association) the virtual wireless network to which BSSID 2 and ESSID 2 are assigned.

In the present invention, since one wireless base station 500 uses a plurality of basic service set identifiers, the basic service set identifiers are not limited to MAC addresses and are logically determined.

If, for example, the MAC address of the wireless base station 500 which logically separates a network into virtual wireless networks is aa:bb:cc:dd:ee:00, BSSID 1 may be set to aa:bb:cc:dd:ee:01; and BSSID 2, to aa:bb:cc:dd:ee:02. In this manner, these identifiers may be determined by sequentially incrementing the value at the last place. According to this method, a maximum of 256 virtual wireless networks can be implemented by one wireless base station.

FIG. 4 is a view exemplifying the management information in the management table 54*a* which the transmission circuit 5 according to this embodiment has.

As shown in FIG. 4, the management table 54*a* is formed such that basic service set identifiers (BSSIDs) in virtual wireless networks coupled to logically separated virtual networks, extended service set identifiers (ESSIDs), maximum retry counts (Max Retry 1 and Max Retry 2) at two levels, delivery traffic indication message beacon periods (DTIM Periods), association counts (Association), and authentication methods (Authentication) are associated with VLAN IDs which logically separate wired LANs.

With the management table 54*a*, when the wireless base station 500 is to transfer a packet from the wired LAN line 100 to a wireless mobile terminal by wireless communication or a packet from a wireless mobile terminal to the wired LAN line 100 by wireless communication, the control unit 53 converts the information (header information) of the header portion of the packet on the basis of the management table 54*a*, and the wireless communication unit 51 or wired communication unit 52 sends out the converted packet.

The control unit 53 identifies the packet received from a logically separated wired LAN, searches the management table 54*a* for a corresponding basic service set identifier, and adds it to the packet. The control unit 53 then causes the wireless communication unit 51 to send out the packet to a wireless channel. Alternatively, the control unit 53 reads the address stored in the wireless header added to the packet received from a wireless mobile terminal, searches for the information stored in the management table 54*a*, and adds corresponding VLAN ID to the packet. The control unit 53 then causes the wired communication unit 52 to send out the packet to a logically separated wired LAN.

According to the wireless network system as this embodiment, a wireless communication unit which performs communication by using one radio frequency is used to send out beacons (notification information) containing different information elements corresponding to the respective virtual wireless networks to be formed and different basic service set identifiers for each virtual wireless network, thereby forming a plurality of logically separated virtual wireless networks.

The management table 54*a* is formed by associating basic service set identifiers and the like in virtual wireless networks with VLAN IDs for logically separating wired LANs. This makes it possible to couple the virtual wireless networks to the logically separated wired networks.

Operation to establish wireless communication between the wireless base station 500 and a wireless mobile terminal in each virtual wireless network will be described next.

The wireless mobile terminal 600 sends out (probe request) a management frame storing a preset extended service set identifier (ESSID 1) to search for a wireless base station within a neighboring wireless communicative range.

If a probe request from the wireless mobile terminal 600 coincides with the preset extended service set identifier (ESSID 1), the wireless base station 500 searches the management table 54*a*, adds a wireless header storing the corresponding 48-bit basic service set identifier (xxxxx:01) to a management frame, and returns the management frame storing the extended service set identifier (ESSID 1) (probe response).

Subsequently, the wireless mobile terminal 600 performs predetermined authentication processing and then performs association processing (association).

The wireless mobile terminal 700 sends out a management frame storing a preset extended service set identifier (ESSID 2) different from that of the wireless mobile terminal 600 (probe request), and searches for a wireless base station within the neighboring wireless communicative range.

If the preset extended service set identifier (ESSID 2) coincides with the probe request from the wireless mobile terminal 700, the control unit 53 of the wireless base station 500 searches the management table 54*a*, adds a wireless header storing the corresponding basic service set identifier (xxxxx:02) to a management frame, and returns the management frame containing an extended service set identifier (ESSID 2) (probe response).

Subsequently, the wireless mobile terminal 600 performs predetermined authentication processing and then performs association processing (association).

The wireless mobile terminal 700 sends out (probe request) a management frame storing a different extended service set identifier (ESSID 2) to a predetermined wireless mobile terminal 600 so as to search for a wireless base station within a neighboring wireless communicative range.

If a probe request from the wireless mobile terminal 700 coincides with the preset extended service set identifier (ESSID 2), the control unit 53 of the wireless base station 500 searches the management table 54*a*, adds a wireless header storing the corresponding basic service set identifier (xxxxx:02) to a management frame, and returns the management frame storing the extended service set identifier (ESSID 2) (probe response).

Subsequently, the wireless mobile terminal 700 performs predetermined authentication processing and then performs association processing (association).

In the present invention, a wired LAN is logically separated by the VLAN identifier added to the data frame of a packet. In the wireless base station 500 in this embodiment, VLAN identifiers associated with basic service set identifiers (BSSIDs) and extended service set identifiers (ESSIDs) are stored in the management table 54*a* described above. In addition, association counts, associated terminal information, retry counts, authentication methods, and delivery traffic indication message beacon periods (DTIM Period) which are associated with each other are stored in the management table 54*a*.

FIGS. 5A and 5B are views showing the frame structures of wireless and wired packets which are set as standards according to IEEE802.11 and IEEE802.3, respectively. FIG. 5C shows a table (see IEEE802.11) indicating the meaning of the address in the MAC (Media Access Control) header of the wireless frame shown in FIG. 5A. In this table, "DS" indicates a distribution system defined by IEEE802.11. A packet with To DS of "1" indicates a packet from a wireless mobile terminal to a distribution system, i.e., a packet to a LAN. Likewise, "From DS" indicates a packet from a LAN to a terminal.

When transferring the packet received from the wired LAN line 100 to a wireless mobile terminal by wireless communication, the control unit 53 of the wireless base station 500 reads/identifies the VLAN identifier of the packet having a frame structure which is received from a wired LAN, searches for management information in the management table 54a, and sends out, to a wireless channel, the packet to which a wireless header (a header portion in a frame structure) storing the corresponding basic service set identifier is added.

As described above, the wireless mobile terminals 600 and 700 are associated with the wireless base station 500, and send out various kinds of received packets from the wireless base station 500 to the respective virtual wireless networks.

The wireless mobile terminal 600 receives a management frame coinciding with the extended service set identifier (ESSID 1) preset in itself at the time of association processing (association), together with a basic service set identifier (xxxxx:01), thereby subsequently receiving only a packet in which the basic service set identifier of the wireless header coincides with the self-basic service set identifier (BSSID 1).

That is, the wireless mobile terminal 600 performs the processing of discarding a packet which is transmitted by using the same radio frequency from the wireless base station 500 of the present invention and stores a different basic service set identifier (xxxxx:02) in a wireless header.

Likewise, the wireless mobile terminal 700 receives a management frame which coincides with an extended service set identifier (ESSID 2) preset in itself, together with a basic service set identifier (xxxxx:02) to perform the processing of discarding a packet to which a wireless header storing a different basic service set identifier (xxxxx:01) is added.

When a wireless mobile terminal associated with the wireless base station 500 is to transmit data to a communication partner connected to a wired LAN, the wireless mobile terminal sends out a packet whose wireless header stores a basic service set identifier identified at the time of association. The wireless base station 500 searches for management information stored in the management table 54a by using the wireless header information of the received packet, and sends out a packet obtained by converting the header information into a corresponding VLAN identifier to a wired LAN.

In this manner, the wireless base station 500 reads/identifies the packet received from a logically or physically separated wired LAN, and can send out the packet to a wireless channel upon adding a corresponding basic service set identifier to the frame by referring to the management table 54a described above.

The wireless base station 500 reads the address stored in the wireless header added to the data frame of the packet received from a wireless channel, and can logically separate the wireless network by using a function of sending out a frame to a logically or physically separated wired LAN by referring to the information stored in the management table 54a.

The wireless base station 500 of the present invention has a function of setting maximum retry counts (Max Retry) at two levels with respect to each virtual wireless network by using the management information stored in the management table 54a described above.

Operation to be performed when the wireless base station 500 changes the maximum retry count in accordance with the medium used in each logically separated virtual wireless network will be described by exemplifying the case of a voice packet and a call control packet used to, for example, control on establishment of communication using the voice packet.

Figure 7:
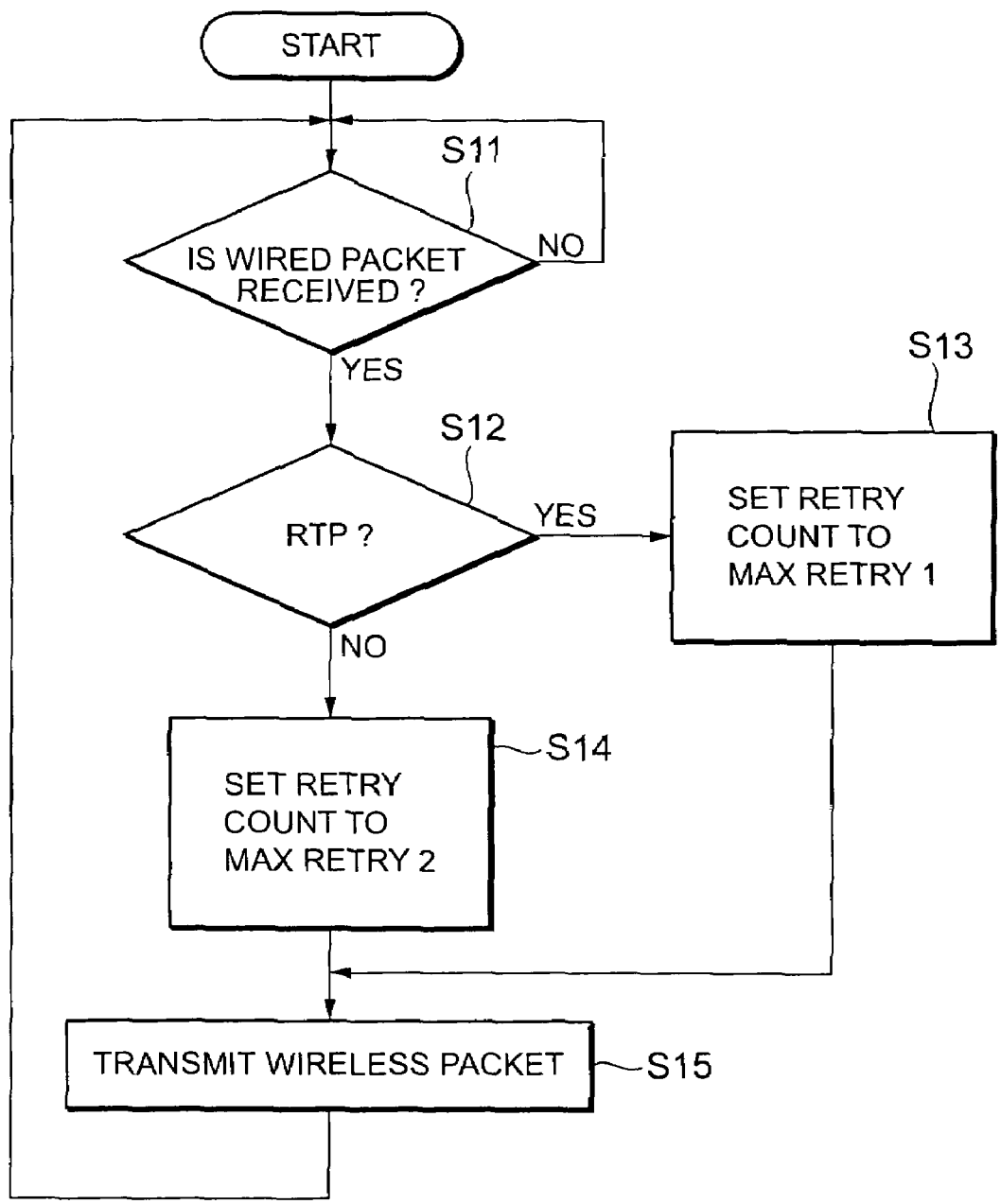
FIG. 7 is a flowchart showing the operation of changing the maximum retry count in accordance with the type of packet received.

FIGS. 6A and 6B show the frame structures of voice and call control packets, respectively. FIG. 7 is a flowchart showing the operation to be performed when the wireless base station 500 changes the maximum retry count depending on whether a received packet is a voice or call control packet.

Upon reception of a packet from a wired LAN (step S11), the wireless base station 500 reads the header of the received packet. If the packet is a voice packet (YES in step S12), the wireless base station 500 limits the maximum retry count to a small value (step S13). If no ACK is returned from the wireless mobile terminal until the maximum retry count is reached, the received packet is discarded. This makes it possible to eliminate unnecessary delivery delays.

If the received packet is a control packet for call processing or the like (NO in step S12), the control packet can be reliably sent (step S15) to a wireless mobile terminal as a transmission destination by increasing the retry count (step S14), thereby ensuring reliability.

As described above, according to the wireless network system of the present invention, since different retry intervals can be set for the respective logically separated virtual wireless networks, the same wireless base station designed to perform communication using one radio frequency can use traffics with different characteristics, e.g., a data network and voice network, in accordance with settings corresponding to the respective characteristics.

Using the wireless base station of the present invention can form a coexistence network in which, for example, the retry count is increased in a data network to improve reliability, whereas the retry intervals are decreased in a voice network to place importance on real-time performance.

The wireless base station 500 of the present invention can set an authentication method for each logically separated virtual wireless network by storing authentication methods in the management table 54a described above.

The same wireless base station can therefore use wireless mobile terminals with different applications. For example, high-precision authentication is performed for a managed wireless mobile terminal by the 802.1x scheme, whereas open authentication is simply performed for a guest wireless mobile terminal which is temporarily used.

The wireless base station 500 of the present invention can set an association count for each logically separated virtual wireless network by storing association counts in the management table 54a described above.

This association count may be set by a person having the right to make settings, e.g., a network manager. Alternatively, the wireless base station 500 may dynamically change the association count in each virtual wireless network. More specifically, the network manager may set the maximum association count (the sum total of association counts in the respective virtual wireless networks with respect to the single wireless base station 500) for the single wireless base station 500, and the wireless base station 500 may dynamically change the association count in each virtual wireless network.

Operation to be performed when the wireless base station 500 dynamically changes the association count in each virtual wireless network will be described below.

Assume that the wireless base station 500 is set in advance by the network manager and operated in the following manner.

The maximum association count set for the single wireless base station 500 is 11, and a wireless base station with ESSID=voice can preferentially use this wireless base station.

Assume that a wireless mobile terminal with ESSID=voice requires a traffic twice as higher than that for a wireless mobile terminal with ESSID=DATA. Letting x be the association count corresponding to ESSID=Voice and y be the number of wireless mobile terminals associated with ESSID=DATA, the association count of wireless mobile terminals corresponding to "DATA" is determined in the following manner.

While all the wireless mobile terminals associated with "Voice" are in the standby state, an association count y corresponding to "DATA" is given by $$y=11-x$$

While three wireless mobile terminals associated with "Voice" are in the busy state and one wireless mobile terminal associated with "Voice" is in the standby state, an association count corresponding to "DATA" is given by $$y=11-3*2-1$$

As described above, the association count y corresponding to "DATA" is dynamically changed in accordance with the traffic of wireless mobile terminals associated with "Voice".

As described above, an association count can be set for each virtual wireless network. The wireless base station 500 of the present invention manages the associated wireless mobile terminals for each virtual wireless network to limit the association count of wireless mobile terminals that can be used with respect traffics with different characteristics, e.g., a data network and voice network used in the wireless band of the same wireless base station in accordance with the respective characteristics.

The wireless base station 500 monitors the states of associated wireless mobile terminals and traffics for each virtual wireless network, and can dynamically limit the number of wireless mobile terminals which can use the wireless band by dynamically changing the association count in each virtual wireless network in accordance with the traffics.

Therefore, the association count for each virtual wireless network can be changed in accordance with the traffic amount.

The operation of a wireless network system which is performed to allow the wireless base station of the present invention to implement each function described above to transfer packets will be described with reference to FIGS. 8 and 9.

Figure 8:
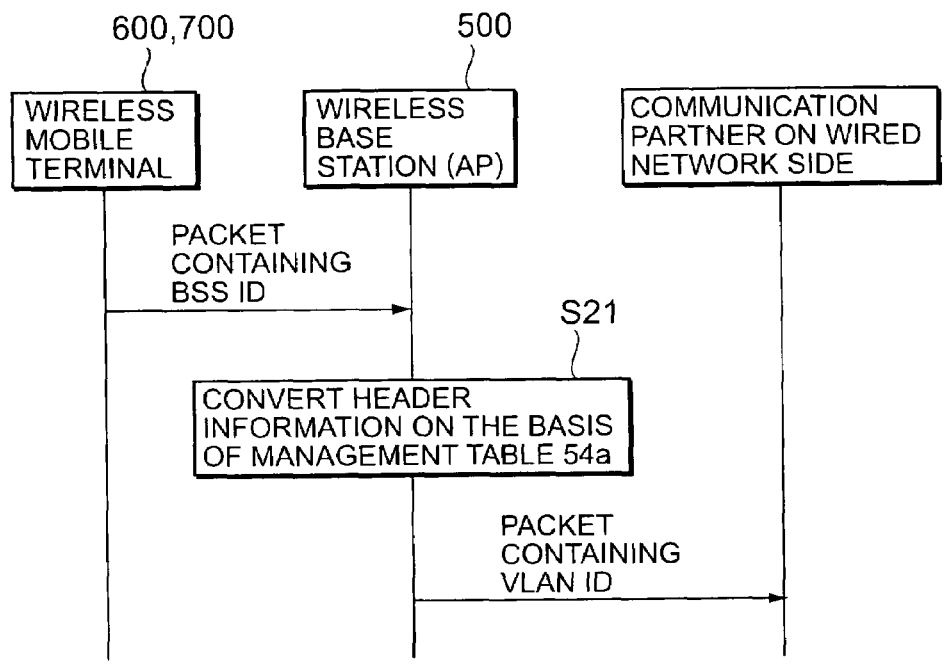
FIG. 8 is a flowchart showing the operation of transferring a packet from a wireless mobile terminal to a wired LAN line 100.

When a packet to be transferred to the wired LAN line 100 is transmitted from a wireless mobile terminal (600 or 700), the wireless base station 500 reads the header information of the transmitted packet containing BSSID, and converts the header information on the basis of the management information in the management table 54*a*, as shown in FIG. 8 (step S21). The wireless base station 500 sends out the packet containing VLAN ID, converted in this manner, to a communication partner on the wired network side.

Figure 9:
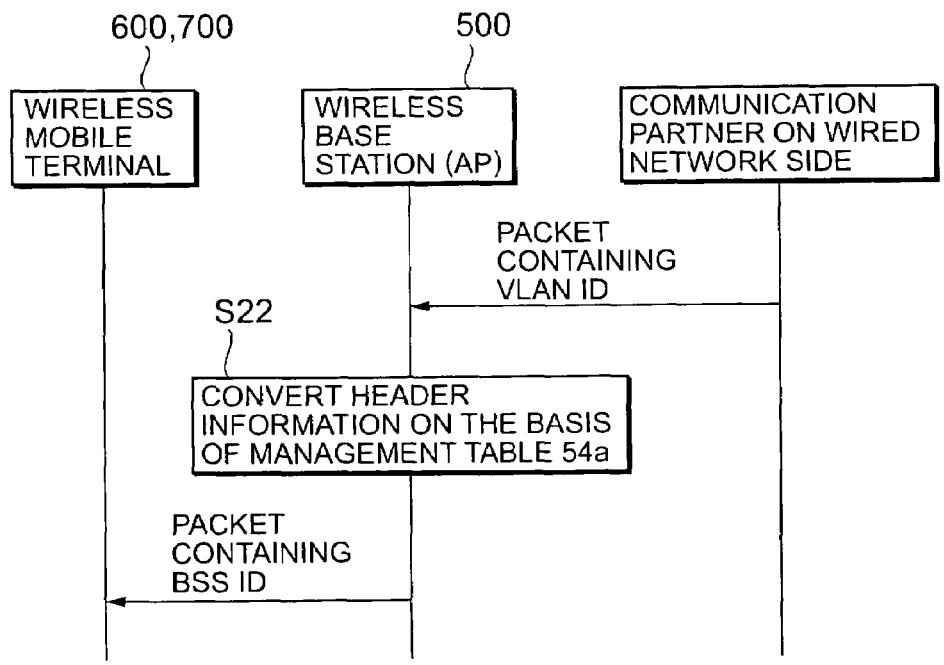
FIG. 9 is a flowchart showing the operation of transferring a packet from the wired LAN line 100 to the wireless mobile terminal.

When a packet to be transferred to a wireless mobile terminal (600 or 700) is transmitted from a communication partner connected to the wired LAN line 100, the wireless base station 500 reads the header information of the transmitted packet containing VLAN ID, and converts the header information on the basis of the management information in the management table 54*a* in the above manner, as shown in FIG. 9 (step S22). The wireless base station 500 sends out the packet containing BSSID, converted in this manner, from the wireless communication unit 51 to the wireless mobile terminal (600 or 700).

Operation to be performed when the wireless mobile terminal 600 or 700 performs association processing (passive scan) by receiving a beacon coinciding with the extended service set identifier preset in itself will be described next.

Figure 10:
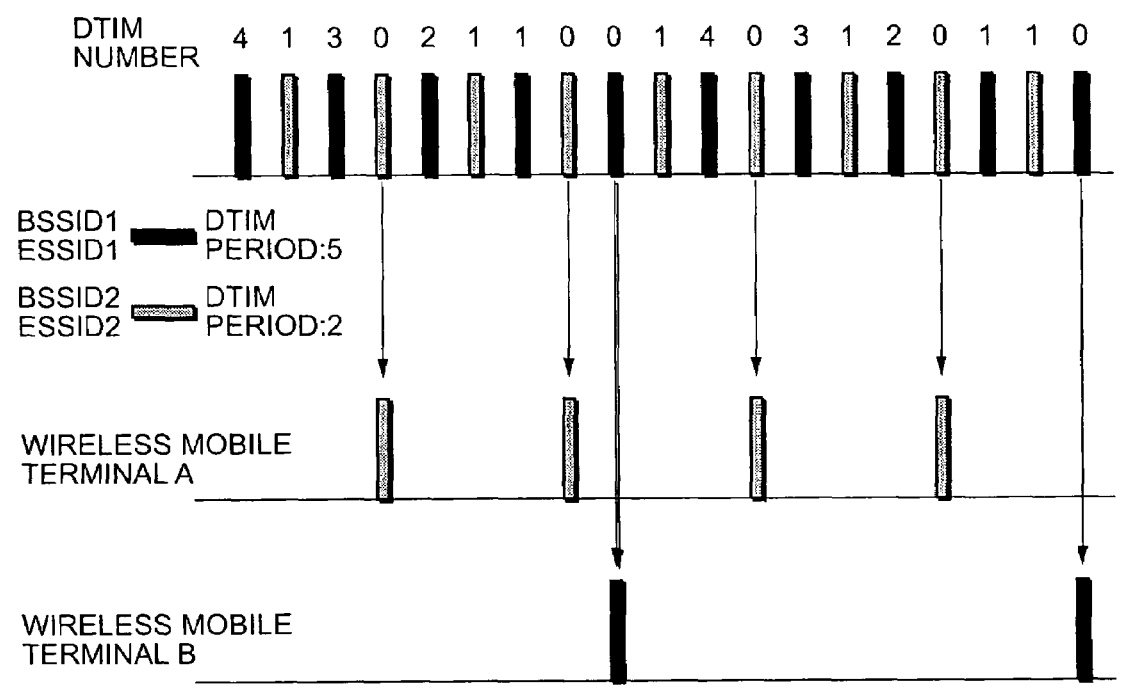
FIG. 10 is a timing chart showing the relationship between the notification information sent out from a wireless base station and the reception of the information by a wireless mobile terminal.

As shown in FIG. 10, the wireless base station 500 causes the control unit 53 to store, in wireless headers, different basic service set identifiers for the respective logically separated virtual networks, and sends out beacons containing different information elements for the respective logically separated virtual wireless networks, thereby logically separating wireless networks by using one wireless communication unit 51.

Delivery traffic indication message beacon periods are stored in the management table 54*a* in correspondence with the respective virtual wireless networks as beacon transmission destinations.

With this operation, as shown in FIG. 10, the control unit 53 causes the wireless communication unit 51 to send out delivery traffic indication message beacons at the stored transmission intervals. This makes it possible to set or change the rise time periods from the power saving mode of wireless mobile terminals associated with different wireless networks without depending on each other.

Even wireless mobile terminals associated with the same wireless base station 500 receive beacons with different information elements. Therefore, different rise time periods can be set for a wireless mobile terminal associated with a network domain with a few broadcasts and a wireless mobile terminal associated with a network domain with many broadcasts in accordance with the characteristics of the respective networks.

This makes it possible to optimally operate the power saving mode for each virtual wireless network and effectively achieve power saving.

As described above, according to the wireless base station of the present invention, wireless networks can be separated at the data link layer, and wireless networks can be separated by using the same wireless station.

In addition, an association count, retry count, delivery traffic indication message beacon period, and authentication method can be set for each logically separated virtual wireless network, and hence properly set networks can be constructed in accordance with the usages of media and wireless mobile terminals used in the respective separated networks.

Note that the above embodiment is a preferred embodiment of the present invention, and can be variously modified and practiced without departing from the spirit and scope of the invention.

For example, the information in the management table 54*a* may be stored in advance or set in advance by a person having the right to change the information, e.g., a network manager. That is, the wireless base station 500 may have a function of allowing a person having the right to change information, e.g., a network manager, to set information to be stored in the management table 54*a* in accordance with the purpose, application, or the like.

According to the above embodiment, a wired network is logically separated by VLAN ID. However, physically separated wired networks may be connected to the wired communication units of wireless base stations. In this case, as identifiers for identifying the respective networks, identifiers other than VLAN ID may be used.

In addition, according to the above embodiment, with regard to the function of the wireless base station 500 which changes the maximum retry count in accordance with the media used in each logically separated virtual wireless network, the media to be used include two types of media, i.e., a voice packet and a call control packet which is used to control the establishment of communication using the voice packet. However, the characteristics of the media to be used (the packets to be received by the wireless base station 500) are not limited to these.

That is, the characteristics of packets may be arbitrarily set as long as the packets to be received by the wireless base station 500 are a real-time communication packet which is set in advance as a packet to be used for communication whose communication contents are reproduced in real time at the transmission destination and a control packet for the real-time communication packet. This real-time communication packet is the voice packet described above or a packet used for streaming in MPEG.

For these two types of packets, maximum retry counts are set and stored in the management table 54a at two levels for the side with a few broadcasts and the side with many broadcasts. When the characteristic of a received packet indicates the above real-time communication packet, the control unit 53 of the wireless base station 500 therefore performs control to set the maximum retry count to one of the values at the two levels which is set for the side with a few broadcasts. When the characteristic of a packet indicates the above control packet, the control unit 53 performs control to set the maximum retry count to one of the values at the two levels which is set for the side with many broadcasts.

With this operation, according to the wireless base station of the present invention, one wireless base station designed to perform communication using one radio frequency can be operated for data communication but also can be operated under the settings corresponding to the characteristics of real-time communication packets, for which real-time performance is required, e.g., a voice packet and a packet used for streaming. As described above, a coexistence network can be formed, which is used under the settings corresponding to the characteristics of traffics with different characteristics.

In the above embodiment, maximum retry counts are set at two levels. However, maximum retry counts may be set at an arbitrary number of levels more than one.

In this case, the control unit 53 changes the above maximum retry count to one or more levels in accordance with the characteristic of a received packet.

According to the embodiment described above, a program is stored in a ROM or the like. However, the present invention is not limited to this as long as a computer-readable recording medium is used. For example, a program may be stored in a nonvolatile memory or EEPROM.

The above functions of the embodiment of the present invention may be implemented by causing the CPU of a wireless base station or the like to perform processing in accordance with the program supplied from the above recording medium.

In this case, the present invention can be applied to even a case wherein pieces of information including a program are supplied from the above recording medium to an output device or from an external recording medium to the output device through a network.

That is, the program codes themselves read out from the recording medium implement the new functions of the present invention, and the recording medium storing the program codes and the signals read out from the recording medium constitute the present invention.

According to the program of the present invention, the wireless base station controlled by the program can implement the respective functions of the embodiment according to the present invention described above.

What is claimed is:

1. A wireless base station, comprising:
   wired communication means which is connected to a wired network for sending out packets;
   wireless communication means for performing wireless communication by using a radio frequency;
   a channel bridging function; and
   control means for controlling said wireless communication means to send out packets storing pieces of information corresponding to a plurality of virtual wireless networks so as to form the plurality of virtual wireless networks,
   wherein said control means causes said wireless communication means to send out, as packets storing pieces of information corresponding to a plurality of virtual wireless networks, notification information storing an information element which changes for said plurality of virtual wireless networks and a packet storing a basic service set identifier which changes for each of said plurality of virtual wireless networks.

2. A wireless base station, comprising:
   wired communication means which is connected to a wired network for sending out packets;
   wireless communication means for performing wireless communication by using a radio frequency;
   a channel bridging function; and
   control means for controlling said wireless communication means to send out packets storing pieces of information corresponding to a plurality of virtual wireless networks so as to form the plurality of virtual wireless networks,
   wherein said station comprises a management table in which identifiers of one of logically and physically separated wired networks and basic service set identifiers of virtual wireless networks coupled to the networks are associated with each other, and
   said control means converts on the basis of said management table header information of a packet which is received by said wired communication means and addressed to a wireless channel, sends out the information through said wireless communication means, converts on the basis of said management table header information of a packet which is received by said wireless communication means and addressed to a wired line, and sends out the information through said wired communication means.

3. A station according to claim 2, wherein in said management table, identifiers of the wired networks and extended service set identifiers of virtual wireless networks coupled to the networks are stored so as to be associated with each other.

4. A station according to claim 3, wherein said control means stores an extended service set identifier which changes for each virtual wireless network in a management frame to be returned in response to a request from a wireless mobile terminal on the basis of said management table, and returns the management frame to the wireless mobile terminal which has sent the request, together with a basic service set identifier of the virtual wireless network to which the extended service set identifier is assigned.

5. A station according to claim 2, wherein in said management table, identifiers of the wired networks and association counts of virtual wireless networks coupled to the networks are stored so as to be associated with each other.

6. A station according to claim 5, wherein said control means identifies a type of wireless mobile terminal associated with a virtual wireless network from an extended service set identifier of the virtual wireless network, and performs control to change the association count in said management table in accordance with a traffic amount for each type of wireless mobile terminal associated with the virtual wireless network having a basic service set identifier with which the association count is associated.

7. A station according to claim 2, wherein in said management table, identifiers of the wired networks and maximum retry counts of virtual wireless networks coupled to the networks are stored so as to be associated with each other.

8. A station according to claim 7, wherein the maximum retry counts in said management table can be set at not less than one level for each virtual wireless network, and said control means changes the maximum retry count to not less than one level in accordance with a characteristic of a received packet.

9. A station according to claim 8, wherein the maximum retry counts in said management table are set at two levels on a side with a few broadcasts and a side with many broadcasts for each virtual wireless network,
wherein the characteristic of the received packet indicates a real-time communication packet which is set in advance as a packet to be used for communication whose communication contents are reproduced in real time at a transmission destination and a control packet for the real-time communication packet, and
wherein said control means performs control to set the maximum retry count on the side with a few broadcasts when the characteristic of the received packet indicates a real-time communication packet, and sets the maximum retry count on the side with many broadcasts when the characteristic of the received packet indicates a control packet.

10. A station according to claim 2, wherein in said management table, identifiers of the wired networks and authentication methods in virtual wireless networks coupled to the networks are stored so as to be associated with each other.

11. A station according to claim 2, wherein in said management table, identifiers of the wired networks and delivery traffic indication message notification information periods in virtual wireless networks coupled to the networks are stored so as to be associated with each other.

12. A wireless network system, comprising:
one of a logically and a physically separated wired network;
a wireless base station connected to said wired network; and
a plurality of wireless mobile terminals which perform wireless communication with said wireless base station,
wherein said wireless base station comprises:
wired communication means which is connected to a wired network for sending out packets;
wireless communication means for performing wireless communication with said wireless mobile terminals by using one radio frequency; and
a channel bridging function; and
control means for controlling said wireless communication means to send out packets storing pieces of information corresponding to a plurality of virtual wireless networks so as to form the plurality of virtual wireless networks,
wherein said control means causes said wireless communication means to send out, as packets storing pieces of information corresponding to a plurality of virtual wireless networks, notification information storing an information element which changes for said each virtual wireless network and a packet storing a basic service set identifier which changes for said each virtual wireless network.

13. A wireless network system, comprising:
one of a logically and a physically separated wired network;
a wireless base station connected to said wired network; and
a plurality of wireless mobile terminals which perform wireless communication with said wireless base station,
wherein said wireless base station comprises:
wired communication means which is connected to a wired network for sending out packets;
wireless communication means for performing wireless communication with said wireless mobile terminals by using one radio frequency; and
a channel bridging function; and
control means for controlling said wireless communication means to send out packets storing pieces of information corresponding to a plurality of virtual wireless networks so as to form the plurality of virtual wireless networks,
wherein said station comprises a management table in which identifiers of one of logically and physically separated wired networks and basic service set identifiers of virtual wireless networks coupled to the networks are associated with each other, and
wherein said control means converts on the basis of said management table header information of a packet which is received by said wired communication means and addressed to a wireless channel, sends out the information through said wireless communication means, converts on the basis of said management table header information of a packet which is received by said wireless communication means and addressed to a wired line, and sends out the information through said wired communication means.

14. A system according to claim 13, wherein in said management table, identifiers of the wired networks and extended service set identifiers of virtual wireless networks coupled to the networks are stored so as to be associated with each other.

15. A system according to claim 14, wherein said control means stores an extended service set identifier which changes for each virtual wireless network in a management frame to be returned in response to a request from a wireless mobile terminal on the basis of said management table, and returns the management frame to the wireless
mobile terminal which has sent the request, together with a basic service set identifier of the virtual wireless network to which the extended service set identifier is assigned.

16. A system according to claim 13, wherein in said management table, identifiers of the wired networks and association counts of virtual wireless networks coupled to the networks are stored so as to be associated with each other.

17. A system according to claim 16, wherein said control means identifies a type of wireless mobile terminal associated with a virtual wireless network from an extended service set identifier of the virtual wireless network, and performs control to change the association count in said management table in accordance with a traffic amount for each type of wireless mobile terminal associated with the virtual wireless network having a basic service set identifier with which the association count is associated.

18. A system according to claim 13, wherein in said management table, identifiers of the wired networks and maximum retry counts of virtual wireless networks coupled to the networks are stored so as to be associated with each other.

19. A system according to claim 18, wherein the maximum retry counts in said management table can be set at not less than one level for each virtual wireless network, and said control means changes the maximum retry count to not less than one level in accordance with a characteristic of a received packet.

20. A system according to claim 19, wherein the maximum retry counts in said management table are set at two levels on a side with a few broadcasts and a side with many broadcasts for each virtual wireless network,
   wherein the characteristic of the received packet indicates a real-time communication packet which is set in advance as a packet to be used for communication whose communication contents are reproduced in real time at a transmission destination and a control packet for the real-time communication packet, and
   wherein said control means performs control to set the maximum retry count on the side with a few broadcasts when the characteristic of the received packet indicates a real-time communication packet, and sets the maximum retry count on the side with many broadcasts when the characteristic of the received packet indicates a control packet.

21. A system according to claim 13, wherein in said management table, identifiers of the wired networks and authentication methods in virtual wireless networks coupled to the networks are stored so as to be associated with each other.

22. A system according to claim 13, wherein in said management table, identifiers of the wired networks and delivery traffic indication message notification information periods in virtual wireless networks coupled to the networks are stored so as to be associated with each other.

23. A system according to claim 12, comprising a plurality of wireless base stations having identical settings, wherein control means of said plurality of wireless base stations perform control to continue communication without changing a network layer address of said wireless mobile terminal even when said wireless mobile terminal switches a wireless base station for wireless communication among said plurality of wireless base stations.

24. A wireless communication method in a wireless network system including one of a logically and a physically separated wired network, a wireless base station connected to the wired network, and a plurality of wireless mobile terminals which performs wireless communication with the wireless base station, comprising:
   sending out a converted packet after converting header information of a received packet on the basis of a management table including information for conversion of header information of a packet to be transferred, when the wireless base station one of receives a packet addressed to the wireless mobile terminal from the wired network and sends out the packet to the wireless mobile terminal, and receives a packet addressed to a communication partner in the wired network from the wireless mobile terminal and sends out the packet to the communication partner.

25. A method according to claim 24, wherein the management table is formed such that identifiers of the respective wired networks and basic service set identifiers of virtual wireless networks coupled to the networks are associated with each other, and after converting heading information, the identifier of the wired network in header information of a packet to be transferred and the basic service set identifier of the virtual wireless network are converted.

26. A method according to claim 25, wherein the management table is formed such that identifiers of the respective wired networks and extended service set identifiers of virtual wireless networks coupled to the networks are associated with each other, and after converting heading information, the identifier of the wired network in header information of a packet to be transferred and the basic service set identifier and the extended service set identifier of the virtual wireless network are converted.

27. A computer readable medium embodied with a control program for a wireless base station including wired communication means which is connected to a wired network, wireless communication means for performing wireless communication by using one radio frequency, and a wired line/wireless channel bridging function, the control program causing the wireless base station to execute processing defined in the wireless communication method of claim 24.

28. A station according to claim 1, wherein said channel bridging function comprises:
   a wired line channel bridging function.

29. A station according to claim 1, wherein said channel bridging function comprises:
   a wireless channel bridging function.

30. A system according to claim 12, wherein said channel bridging function comprises:
   a wired line channel bridging function.

31. A system according to claim 12, wherein said channel bridging function comprises:
   a wireless channel bridging function.

* * * * *